United States Patent
Kim et al.

(10) Patent No.: US 9,326,299 B2
(45) Date of Patent: Apr. 26, 2016

(54) METHOD FOR RECEIVING DATA AND WIRELESS DEVICE

(71) Applicant: LG ELECTRONICS INC., Seoul (KR)

(72) Inventors: Hak Seong Kim, Anyang-si (KR); Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 14/356,090

(22) PCT Filed: Nov. 8, 2012

(86) PCT No.: PCT/KR2012/009397
§ 371 (c)(1),
(2) Date: May 2, 2014

(87) PCT Pub. No.: WO2013/069984
PCT Pub. Date: May 16, 2013

(65) Prior Publication Data
US 2014/0307690 A1     Oct. 16, 2014

Related U.S. Application Data

(60) Provisional application No. 61/557,378, filed on Nov. 8, 2011, provisional application No. 61/559,137, filed on Nov. 13, 2011, provisional application No. 61/560,232, filed on Nov. 15, 2011, provisional application No. 61/560,235, filed on Nov. 15, 2011, provisional application No. 61/561,924, filed on Nov. 20, 2011, provisional application No. 61/562,419, filed on Nov. 21, 2011.

(51) Int. Cl.
| | |
|---|---|
| H04W 72/12 | (2009.01) |
| H04W 72/04 | (2009.01) |
| H04W 74/00 | (2009.01) |
| H04B 7/26 | (2006.01) |
| H04L 5/00 | (2006.01) |

(52) U.S. Cl.
CPC ......... *H04W 72/1289* (2013.01); *H04B 7/2656* (2013.01); *H04L 5/0051* (2013.01); *H04W 72/042* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 2008/0285512 A1* | 11/2008 | Pan et al. | 370/329 |
| 2011/0075684 A1* | 3/2011 | Zeng et al. | 370/475 |
| 2013/0039284 A1* | 2/2013 | Marinier et al. | 370/329 |

FOREIGN PATENT DOCUMENTS

| | | |
|---|---|---|
| KR | 10-2008-0039787 A | 5/2008 |
| KR | 10-2010-0086920 A | 8/2010 |
| KR | 10-2011-0016888 A | 2/2011 |
| KR | 10-2011-0068807 A | 6/2011 |

* cited by examiner

Primary Examiner — Ashley Shivers
(74) Attorney, Agent, or Firm — Dentons US LLP

(57) ABSTRACT

Provided are a method for receiving data in a wireless communication system and a wireless device. The wireless device receives a downlink grant on a downlink control channel, and determines the size of a downlink transmission block on the basis of the downlink grant. The maximum size of the downlink transmission block is limited to below or equal to a specific value.

13 Claims, 12 Drawing Sheets

METHOD FOR RECEIVING DATA AND WIRELESS DEVICE

This application is a National Stage entry of International Application No. PCT/KR2012/009397 filed Nov. 8, 2012, which claims priority to U.S. Provisional Application Nos. 61/557,378 filed Nov. 8, 2011; 61/559,137 filed Nov. 13, 2011; 61/560,232 filed Nov. 15, 2011; 61/560,235 filed Nov. 15, 2011; 61/561,924 filed Nov. 20, 2011; and 61/562,419 filed Nov. 21, 2011, all of which are incorporated herein by reference.

BACKGROUND OF THE INVENTION

1. Field of the Invention

The present invention relates to wireless communication, and more particularly, to a method of receiving data in a wireless communication system, and a wireless device using the method 2. Related Art Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of the 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Since the PDCCH is monitored on the basis of blind decoding, it is important to acquire control information by rapidly decoding the PDCCH. A time required to decode data on a specific channel is called a processing time, which has a great effect on a design of an operation requiring a signal exchange between a base station and a user equipment, similarly to a hybrid automatic repeat request (HARQ).

A channel state may vary depending on a propagation delay. In a wireless communication system, a timing advance (TA) is set to adjust an uplink synchronization of each wireless device, by considering the propagation delay. This is to advance uplink transmission by the TA in a wireless device which experiences the propagation delay.

As a required cell coverage is increased, the TA value is also increased. Therefore, a processing time required for decoding may not be ensured due to the advanced uplink transmission.

SUMMARY OF THE INVENTION

The present invention provides a data reception method and a wireless device using the method.

In an aspect, a method of receiving data in a wireless communication system is provided. The method includes monitoring, by the wireless device, a downlink control channel on the basis of a reference signal specific to the wireless device, receiving a downlink grant on the downlink control channel, determining a size of a downlink transport block on the basis of the downlink grant, and receiving the downlink transport block on a downlink shared channel. A maximum size of the downlink transport block is limited to be less than or equal to a specific value.

The downlink grant may include information regarding a modulation and coding scheme (MCS) index and the number of allocated resource blocks, and the size of the downlink transport block may be determined according to the MCS index and the number of allocated resource blocks.

The method may further include reporting, by the wireless device, a channel state indicating MCS information to a base station. The size of the downlink transport block may be determined based on the MCS information.

In another aspect, a wireless device in a wireless communication system includes a radio frequency (RF) unit configured to transmit and receive a radio signal, and a processor operatively coupled to the RF unit and configured to monitor a downlink control channel on the basis of a reference signal specific to the wireless device, receive a downlink grant on the downlink control channel, determine a size of a downlink transport block on the basis of the downlink grant, and receive the downlink transport block on a downlink shared channel. maximum size of the downlink transport block is limited to be less than or equal to a specific value.

A processing time delay can be avoided according to a channel state or capability of a user equipment.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
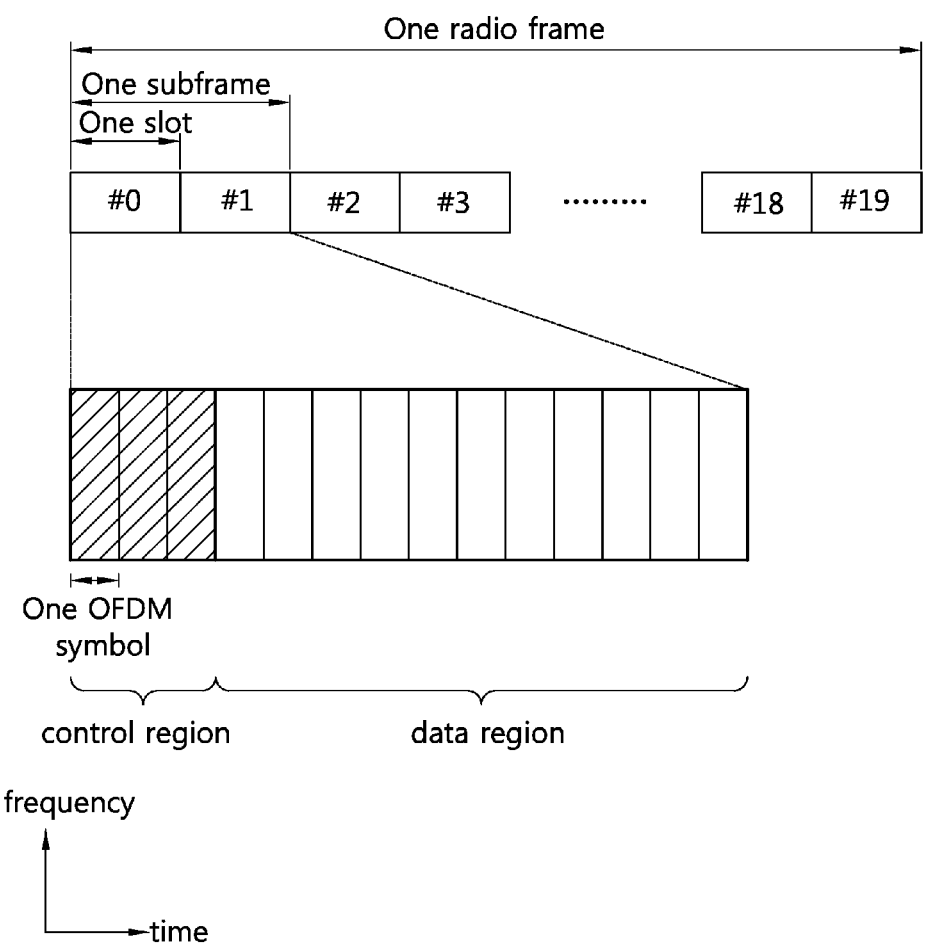
FIG. 1 shows a structure of a downlink (DL) radio frame in 3rd generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7•12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
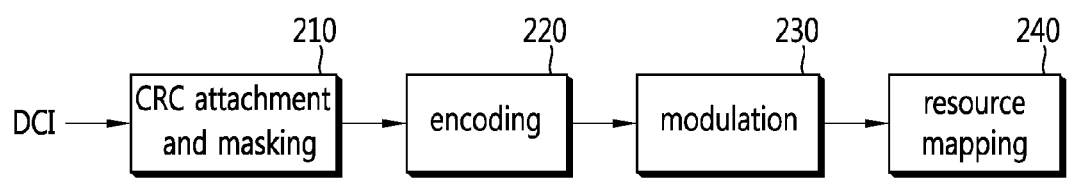
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The Coded Data is Modulated to Generate Modulation Symbols (Block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set { 1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
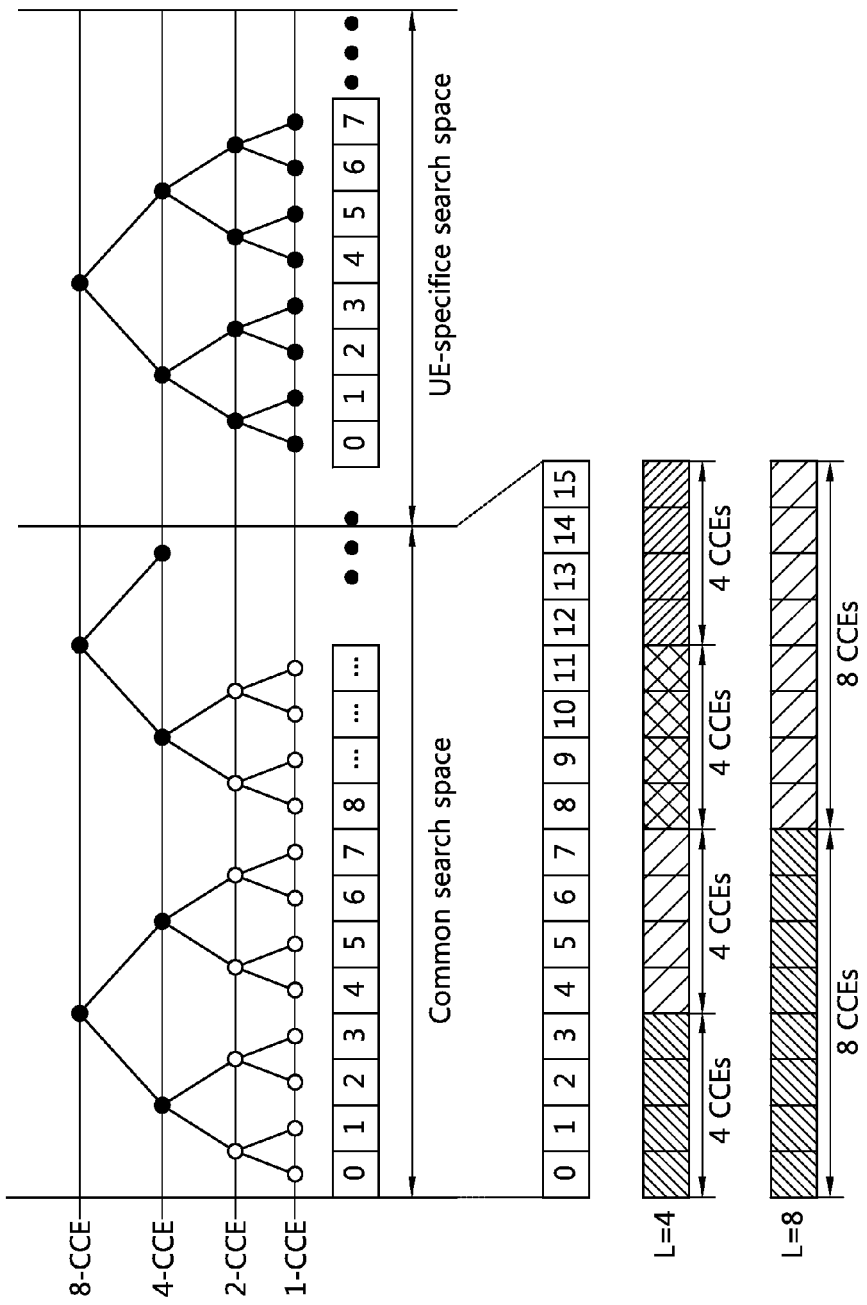
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of { 4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{ 1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k+m') \bmod \lfloor N_{CCE,k}/L \rfloor\} \qquad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k−1}$. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k=(A \cdot Y_{k-1}) \bmod D \qquad \text{[Equation 2]}$$

Herein, $Y_{-1}=n_{RNTI}\neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
| | DCI format 1 | UE specific | Single antenna port, port 0 |

TABLE 2-continued

| Transmission mode | DCI format | search space | Transmission mode of PDSCH based on PDCCH |
|---|---|---|---|
| Mode 2 | DCI format 1A | common and UE specific | Transmit diversity |
| | DCI format 1 | UE specific | Transmit diversity |
| Mode 3 | DCI format 1A | common and UE specific | Transmit diversity |
| | DCI format 2A | UE specific | CDD(Cyclic Delay Diversity) or Transmit diversity |
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO(Multi-user Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
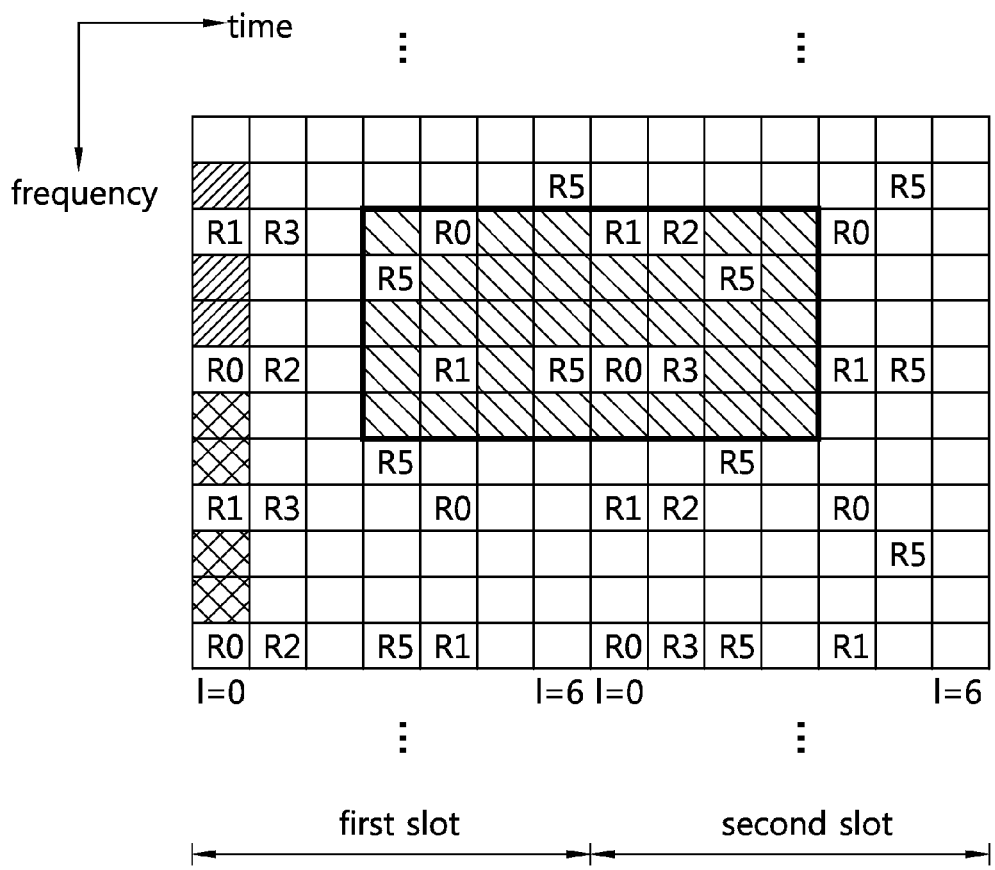
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1-2 \cdot c(2m)) + j\frac{1}{\sqrt{2}}(1-2 \cdot c(2m+1)) \quad \text{[Equation 3]}$$

Herein, $m=0, 1, \ldots, 2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc))\bmod 2 \: x_1(n+31)=(x_1(n+3)+x_1(n))\bmod 2 \: x_2(n+31)=(x_2(n+3)+x_2(n+2)+x_2(n+1)+x_2(n))\bmod 2 \quad \text{[Equation 4]}$$

Herein, Nc=1600, and a first m-sequence is initialized as $x_1(0)=1, x_1(n)=0, m=1, 2, \ldots, 30$.

A second m-sequence is initialized as $c_{init}=2^{10}(7(ns+1)+1+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=(\text{floor}(ns/2)+1)(2 N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=(\text{floor}(ns/2)+1)(2 N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
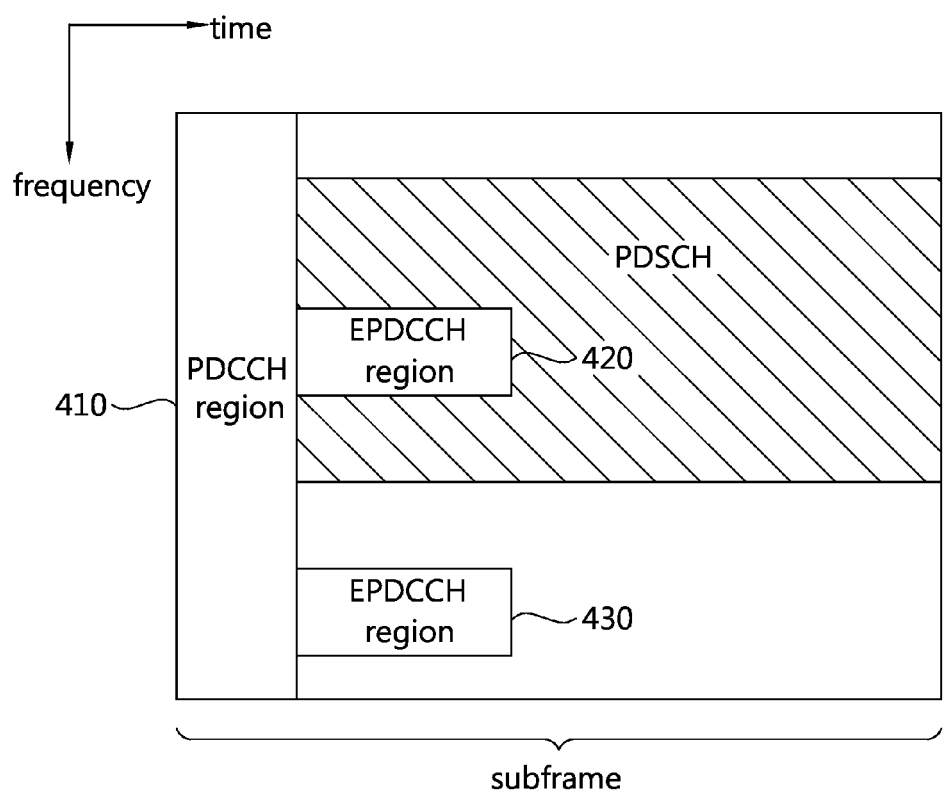
FIG. 5 is an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}=(\text{floor}(ns/2)+1)(2 N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

Hereinafter, an EPDDCH search space may correspond to an EPDCCH region. In the EPDCCH search space, one or more EPDCCH candidates may be monitored for each one or more aggregation levels.

Now, a method of determining a transport block size (TBS) will be described with reference to the section 7.1.7 of 3GPP TS 36.213 V10.2.0 (2011-06).

First, a wireless device receives a DL grant on a PDCCH, and determines the TBS. Then, the wireless device receives a transport block on a PDSCH on the basis of the determined TBS.

The DL grant includes a modulation and coding scheme (MCS) index IMCS and the number NPRB of allocated RBs. The wireless device determines a modulation order and an TBS index ITBS from IMCS as shown in the following table.

TABLE 5

| MCS index $I_{MCS}$ | Modulation order | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 4 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 6 | 27 |
| 28 | 6 | 28 |
| 29 | 2 | reserved |
| 30 | 4 | reserved |
| 31 | 6 | reserved |

In 3GPP TS 36.213, the TBS is pre-defined according to the TBS index $I_{TBS}$ and the number $N_{PRB}$ of the allocated RBs, where $1<=N_{PRB}<=110$. The following table shows an example of $1<=N_{PRB}<=10$ in the defined TBS.

TABLE 6

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |

TABLE 6-continued

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The wireless device acquires desired information from a BS, by demodulating and decoding a DL transport block on a PDSCH by the use of a channel estimation value acquired from a DL reference signal and DCI on a DL control channel.

Since the DL control channel (e.g., PDCCH, EPDCCH) is monitored based on blind decoding, it is important to acquire the DCI by rapidly decoding the DL control channel. A time required to decode data on a specific channel is called a processing time, which has a great effect on a design of an operation requiring a signal exchange between the BS and a UE similarly to HARQ.

Figure 6:
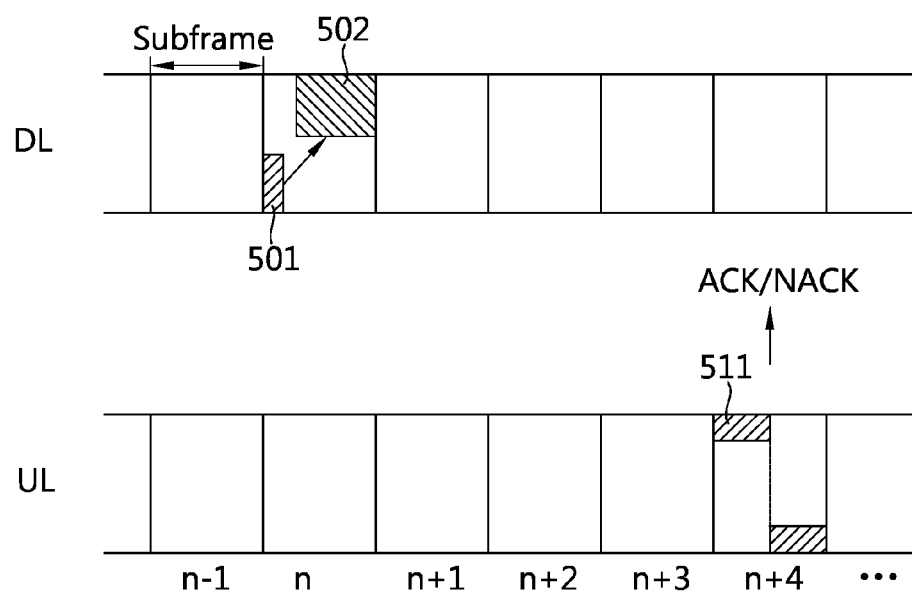
FIG. 6 shows a DL hybrid automatic repeat request (HARQ) operation in 3GPP LTE.

FIG. 6 shows a DL HARQ operation in 3GPP LTE.

A wireless device monitors a PDCCH, and receives a DL grant including a DL resource allocation on a PDCCH 501 in an nth DL subframe. The wireless device receives a DL transport block through a PDSCH 502 indicated by the DL resource allocation.

The wireless device transmits an ACK/NACK signal for the DL transport block on a PUCCH 511 in an (n+4)th UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE, a time required to transmit the ACK/NACK signal after the wireless device ends decoding of the DL transport block is defined as 4 subframes. The 4 subframes are a fixed value in case of frequency division duplex (FDD), but are variable in case of time division duplex (TDD).

The following table shows a DL subframe n-k associated with a UL subframe n depending on the UL-DL configuration in 3GPP LTE. Herein, k•K, where M is the number of elements of a set K.

TABLE 7

| UL-DL configuration | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the UL-DL configuration 5, the UL subframe 2 may be associated with 9 DL subframes {13,12,9,8, 7,5,4,11,6}. ACK/NACK for the associated DL subframe may be transmitted in the UL subframe 2.

However, a channel state may vary depending on a movement of the wireless device, a wide coverage, a propagation delay, etc. In a wireless communication system, a timing advance (TA) is set to adjust a UL synchronization of each wireless device, by considering the propagation delay. This is to advance UL transmission by the TA in the wireless device which experiences the propagation delay. However, as a great TA is set and an EPDCCH is introduced, the 4 subframes conventionally used may not be enough to ensure a sufficient processing time.

Figure 7:
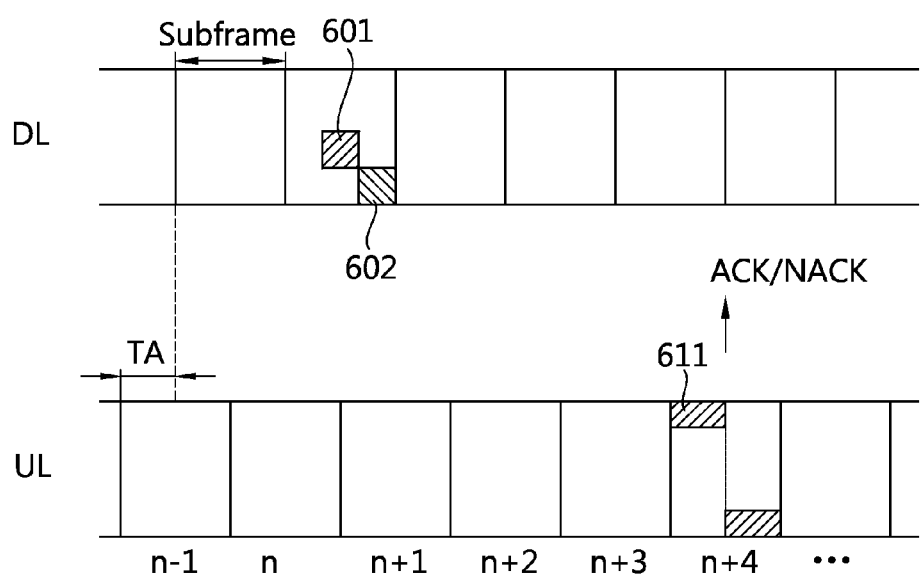
FIG. 7 shows time advance (TA)-based HARQ transmission.

FIG. 7 shows TA-based HARQ transmission.

A wireless device receives a DL grant on an EPDCCH 601 in a subframe n, and receives a DL transport block on a PDSCH 602. The wireless device may intend to transmit ACK/NACK in a subframe n+4, but 4 subframes may not be enough to ensure a sufficient processing time due to a great TA. This is called a decoding latency.

According to an embodiment of the proposed method, the wireless device may determine a possible TBS and/or MCS, etc., and may report information regarding thereon to the BS, by considering its capability and channel state. If it is determined that a series of processes cannot be completely finished within a determined time by using a current capability since the TA value is significantly great, the wireless device may report recommended information to the BS. The recommended information may include a receivable maximum reception data amount (e.g., TBS, code block size), a maximum reception packet size, a coding rate, a modulation scheme, a transmission mode, a DCI format, the number of serving cells to be served at the same time, whether to apply a carrier aggregation, a CCE size, a to-be-monitored search space configuration, a cyclic prefix (CP), the number of DM RS ports, whether to use an EPDCCH, whether to support CoMP, or a combination thereof.

If the TA value is greater than a threshold, the wireless device may monitor the EPDCCH within a preceding duration (e.g., a first slot) of a subframe or may request the BS to perform monitoring. The BS may be configured such that the EPDCCH search space is defined only within the preceding duration.

As described above, an HARQ processing time varies in TDD. According to a UL-DL configuration, the proposed method may be applied only when the processing time is insufficient. For example, due to a great TA, if it is difficult to ensure the HARQ processing time by using only 4 subframes, the recommended information may be sent only when the number of subframes is less than or equal to 4, or an EPDCCH search space may be limited.

If it is determined that the processing time can exceed its capability, the wireless device may report a state of the wireless device to the BS or may transmit the recommended information (e.g., possible TBS, MCS) to the BS. The wireless device may report the recommended information at the occurrence of a specific event, for example, a case where a TA value is greater than a threshold, or may report the recommended information periodically.

To recognize a limitation required for DL transmission, the BS may request the wireless device to transmit the recommended information.

Now, a method of reporting a channel state when a DL reception limitation is required due to a decoding latency will be described.

Figure 8:
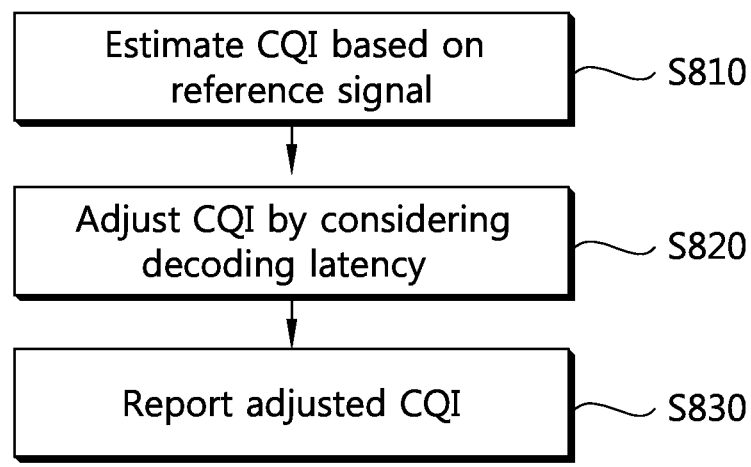
FIG. 8 is a flowchart showing a channel state reporting method according to an embodiment of the present invention.

FIG. 8 is a flowchart showing a channel state reporting method according to an embodiment of the present invention.

In step S810, a wireless device estimates CQI on the basis of a reference signal. The reference signal may include at least any one of the aforementioned CRS, URS, and DM RS.

In step S820, the wireless device adjusts the CQI by considering a decoding latency. In step S830, the wireless device reports the adjusted CQI to a BS.

When it is expected that an operation may have a problem due to the decoding latency or when the operation is problematic, the wireless device determines CQI by considering not only a channel state but also the decoding latency. For example, assume that the CQI indicates $I_{MCS}$ of Table 5. Although $I_{MCS}$ measured on the basis of the reference signal is 10, $I_{MCS}$ may be decreased to 1 due to the decoding latency (i.e., if it is expected that a processing time is not enough) and then be reported to a BS.

In general, the wireless device calculates a block error rate (BLER) under the assumption that a specific-sized transport block is transmitted by using a designated radio resource, determines an MCS within 10 percent of the calculated value, and reports it to the BS. The wireless device calculates the BLER under the assumption that a TBS acquired to be the most similar to the reported MCS in terms of an effective rate is transmitted through a PDSCH. Therefore, if it is desired to receive the TBS within a specific size due to a great TA, the wireless device may intentionally decrease the reported MCS. The BS may not transmit a transport block having a size exceeding the reported TBS through the PDSCH. The wireless device may report a decodable maximum-sized TBS to the BS.

The wireless device may assume a TBS obtained by adding a specific margin to a TBS indicating an effective rate which is the most similar to a currently reported MCS, as its maximum TBS.

The above method may be applied only when the MCS or the rank is less than or equal to a specific value. For example, it is applicable only when QPSK is used or when the rank is 1.

The above method may be applied limitedly only when an EPDCCH is configured. It may be assumed that a wireless device to which the EPDCCH is configured uses the EDPCCH to schedule the PDSCH, and a wireless device to which the PDCCH is configured uses the PDCCH to schedule the PDSCH. It may be assumed that, when a specific DL control channel is transmitted in association with a specific subframe or when the specific DL control channel is transmitted in a specific subframe, the PDSCH is scheduled by using the DL control channel in the specific subframe. It may be assumed that, when a plurality of DL control channels are received in one subframe, the PDSCH is scheduled through a DL control channel having a greater latency. For example, if the PDCCH and the EPDCCH are both received in one subframe, the PDSCH is scheduled on the basis of the EPDCCH, and CQI or TBS may be determined on the basis of the EPDCCH.

Now, an operation of a wireless device for EPDCCH decoding is proposed.

The wireless device having a problem in a processing time due to a great TBS may request a BS not to have an EPDCCH in a second slot. Alternatively, if the EPDCCH is received in the second slot in the BS, the wireless device may report that the TBS is restricted.

If the BS configures an EPDCCH search space only in a first slot, the wireless device may not monitor the EPDCCH in a second slot of a corresponding subframe. The wireless device may estimate a channel on the basis of a DM RS of the first slot.

It may be assumed that, if the wireless device discovers a DL grant in the first slot, the BS transmits the PDSCH on the basis of a maximum TBS. The wireless device may estimate a channel on the basis of the DM RS of the first slot. It may be assumed that, if the wireless device fails to discover the DL grant in the first slot, the BS transmits the PDSCH on the basis of the restricted TBS. In this case, the wireless device may estimate a channel on the basis of the first slot and the second slot.

If the EPDCCH is monitored in one of the two slots, an indicator for indicating whether the wireless device estimates a channel in the two slots may be transmitted by the BS. The BS may report whether the channel is estimated on the basis of a DM RS for both of the two slots. The BS may report to the wireless device about whether two users use the same precoding, when EPDCCHs of the two users are multiplexed in one PRB pair.

The wireless device may determine whether to use a DM RS of both of the two slots or a DM RS of one slot for channel estimation. The wireless device may determine whether a TBS is restricted according to whether a DL grant is located in the first slot or the second slot. If an EPDCCH search space is arranged to the first slot, the TBS is not restricted. If the EPDCCH search space is arranged to the second slot, the TBS is restricted. The BS may report to the wireless device about whether the EPDCCH search space is located in the first slot or the second slot by using an RRC message or the like.

If the EPDCCH search space is arranged to the second slot, the wireless device may estimate the channel on the basis of the DM RS of both of the two slots. If the EPDCCH search space is arranged to the second slot and a DL grant is discovered, the wireless device may estimate a channel on the basis of the DM RS of the first slot. If the EPDCCH search space is arranged to the second slot and the DL grant is not discovered, the wireless device may monitor the EPDCCH at the second slot and may estimate the channel on the basis of the DM RS of the two slots.

Now, a TBS restriction caused by a decoding latency is described in detail.

A wireless device determines CQI (e.g., MCS) by estimating a channel, and reports the estimated channel to a BS. The BS allocates a DL resource on the basis of the CQI, and sends to the wireless device a DL grant having a bandwidth allocation (e.g., the number of allocated RBs, $N_{PRB}$) and an MCS (e.g., $I_{MCS}$). The wireless device determines the TBS and the MCS on the basis of the DL grant, and demodulates and decodes a DL transport block.

As described above, when a TA is increased, a maximum TBS that can be decoded by the wireless device during a determined time may be decreased.

Figure 9:
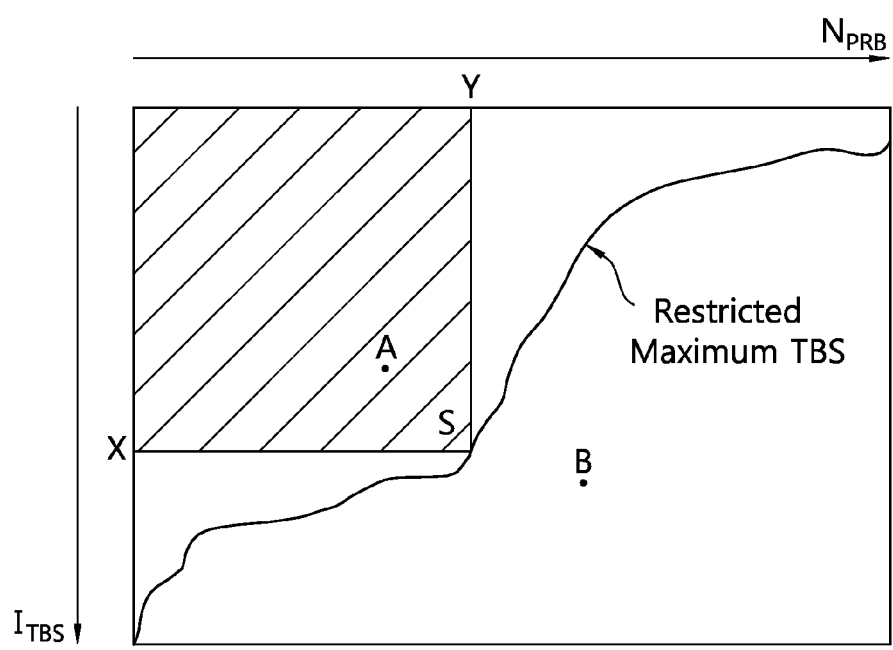
FIG. 9 shows an example of a restricted transport block size (TBS).

FIG. 9 shows an example of a restricted TBS.

A region S, which is determined by $N_{PRB}$=X, $I_{TBS}$=Y, is a TBS that can be scheduled to a corresponding wireless device. X, Y are values defined according to a decoding latency. A maximum possible TBS may be decreased when a TA is increased.

For example, if a TBS corresponding to a point A is allocated, the wireless device may sufficiently decode a transport block within a determined time. However, if a TBS corresponding to a point B is allocated, the wireless device may not be able to decode a corresponding transport block within a determined time.

The wireless device may report information regarding X and Y (or information regarding a maximum possible TBS) to a BS by considering a channel state, TA, etc. Thereafter, if the wireless device reports CQI corresponding to $I_{TBS}$=Y, the BS may allocate the TBS so that $N_{PRB}$ is less than or equal to X.

$N_{PRB}$ may be pre-designated between the BS and the wireless device, and the wireless device may determine the TBS by combining $I_{TBS}$ and the pre-designated $N_{PRB}$. The value of $I_{TBS}$ may be determined based on the CQI reported by the wireless device. This has an advantage in that the restricted maximum TBS can be determined between the BS and the wireless device through the CQI reporting without additional signaling. The wireless device may report CQI adjusted according to its capability and channel state as described above in the embodiment of FIG. 8.

There may be a situation in which the TBS is restricted due to a TA even though the wireless device cannot perform CQI reporting. For example, it is a case where a configuration for the CQI reporting is not yet complete. If the CQI reporting is not configured, the maximum possible TBS may be set to a pre-designated value. The maximum possible TBS may be designated, or at least any one of $N_{PRB}$, $I_{MCS}$, and $I_{TBS}$ may be set to a pre-designated value.

If the wireless device cannot report the CQI, the maximum TBS may be set to the pre-designated value. Alternatively, the maximum TBS may be set to the pre-designated value by considering a decoding latency. The maximum TBS may be set to the pre-designated value according to a TA size or according to whether EPDCCH scheduling is performed. The maximum TBS may be set to the pre-designated value according to a transmission mode or capability of the wireless device.

Table 8 and Table 9 below show an example of $N_{PRB}$ and $I_{TBS}$ that can be set when it is restricted to TBS=1000, in a TBS allocation (some of them are shown in Table 6) defined in 3GPP TS 36.213.

TABLE 8

| $I_{TBS}$ | \multicolumn{10}{c}{$N_{PRB}$} |
|---|---|---|---|---|---|---|---|---|---|---|
|  | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 |  |
| 7 | 104 | 224 | 328 | 472 | 584 | 712 | 840 | 968 |  |  |
| 8 | 120 | 256 | 392 | 536 | 680 | 808 | 968 |  |  |  |
| 9 | 136 | 296 | 456 | 616 | 776 | 936 |  |  |  |  |
| 10 | 144 | 328 | 504 | 680 | 872 |  |  |  |  |  |
| 11 | 176 | 376 | 584 | 776 | 1000 |  |  |  |  |  |
| 12 | 208 | 440 | 680 | 904 |  |  |  |  |  |  |
| 13 | 224 | 488 | 744 | 1000 |  |  |  |  |  |  |
| 14 | 256 | 552 | 840 |  |  |  |  |  |  |  |
| 15 | 280 | 600 | 904 |  |  |  |  |  |  |  |
| 16 | 328 | 632 | 968 |  |  |  |  |  |  |  |
| 17 | 336 | 696 |  |  |  |  |  |  |  |  |
| 18 | 376 | 776 |  |  |  |  |  |  |  |  |
| 19 | 408 | 840 |  |  |  |  |  |  |  |  |
| 20 | 440 | 904 |  |  |  |  |  |  |  |  |
| 21 | 488 | 1000 |  |  |  |  |  |  |  |  |
| 22 | 520 |  |  |  |  |  |  |  |  |  |
| 23 | 552 |  |  |  |  |  |  |  |  |  |
| 24 | 584 |  |  |  |  |  |  |  |  |  |
| 25 | 616 |  |  |  |  |  |  |  |  |  |
| 26 | 712 |  |  |  |  |  |  |  |  |  |

TABLE 9

| $I_{TBS}$ | \multicolumn{10}{c}{$N_{PRB}$} |
| --- | --- | --- | --- | --- | --- | --- | --- | --- | --- | --- |
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | | | |
| 4 | 776 | 840 | 904 | 1000 | | | | | | |
| 5 | 968 | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |
| 11 | | | | | | | | | | |
| 12 | | | | | | | | | | |
| 13 | | | | | | | | | | |
| 14 | | | | | | | | | | |
| 15 | | | | | | | | | | |
| 16 | | | | | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | | | | | | | | | | |
| 23 | | | | | | | | | | |
| 24 | | | | | | | | | | |
| 25 | | | | | | | | | | |
| 26 | | | | | | | | | | |

Now, the aforementioned TBS restriction will be described by taking a case where EPDCCH scheduling is configured, for example. A PDCCH may be monitored in first 3 OFDM symbols of a subframe, whereas an EPDDCH may be monitored after 4 OFDM symbols. Therefore, a processing time may be insufficient in a PDSCH scheduled by the EPDCCH due to a great TA.

Figure 10:
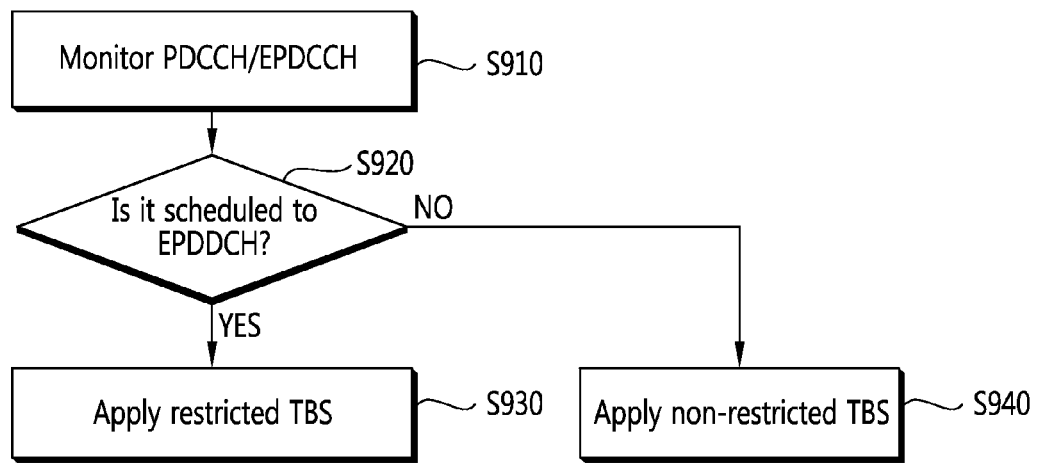
FIG. 10 is a flowchart showing a scheduling method according to an embodiment of the present invention.

FIG. 10 is a flowchart showing a scheduling method according to an embodiment of the present invention.

In step S910, a wireless device monitors a PDCCH and/or an EPDCCH. The PDCCH may not monitor the PDCCH, and monitor only the EPDCCH.

In step S920, the wireless device determines whether to set a TBS restriction according to whether a PDSCH is scheduled to the EPDCCH. In step S930, the wireless device applies the restricted TBS when the PDSCH is scheduled to the EPDCCH. The wireless device receives a DL transport block on the PDSCH on the basis of the applied TBS.

If the TBS is restricted, the wireless device may decrease a maximum possible TBS size as shown in Table 8 and Table 9 above. The maximum possible TBS size may be predetermined, or predetermined values $N_{PRB}$, $I_{MCS}$, and/or $I_{TBS}$ may be used. Alternatively, the possible TBS size may be adjusted according to CQI reported by the wireless device. In step S940, the wireless device applies the restricted TBS when the PDSCH is scheduled to the EPDCCH.

Although the present embodiment shows whether the restricted TBS is used according to whether the EPDCCH is configured, whether the restricted TBS is used may be determined according to a size of TA or according to whether CQI reporting is set. If the TA is greater than a threshold, the restricted TBS may be used, and if the TA is not greater than the threshold, a non-restricted TBS may be used.

Figure 11:
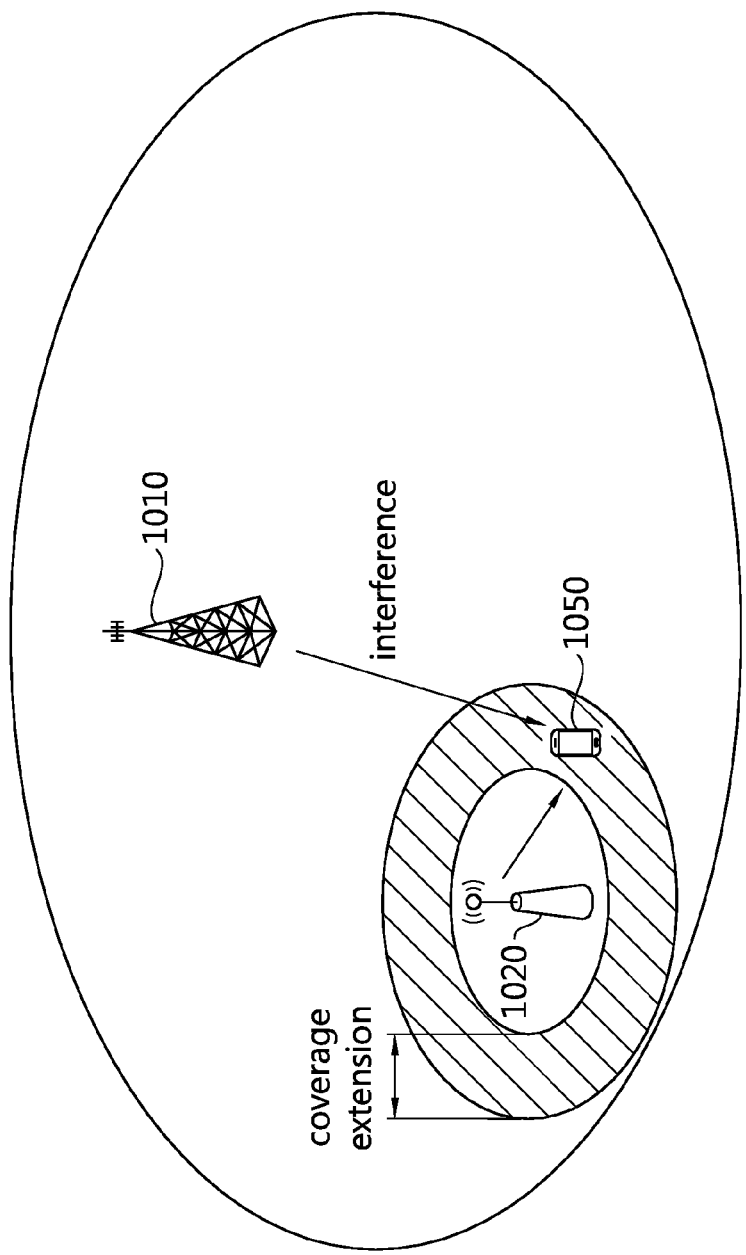
FIG. 11 shows an interference in a macro cell-pico cell environment.

FIG. 11 shows an interference in a macro cell-pico cell environment.

A macro cell 1010 is a cell having a wider coverage than a pico cell 1020. A wireless device 1050 uses the pico cell 1020 as a serving cell. The macro cell 1010 acts as an interference to the wireless device 1050. It is assumed that the macro cell 1010 is an aggressor cell which causes an interference due to an inter-cell interference, and the pico cell 1020 is a victim cell which is damaged by the interference.

In order to decrease the inter-cell interference, an almost blank subframe (ABS) technique is provided. In the ABS, transmission of the aggressor cell is not performed, or signals are transmitted to a minimum extent possible. When the macro cell 1010 uses the ABS, an influence of a macro cell interference is significantly decreased in the pico cell 1020, and there is an effect of extending a coverage of the pico cell 1020 in practice. This is called coverage extension.

One of requirements for mitigating an inter-cell interference is accurate timing acquisition and tracking. This is also called a synchronization process.

CRS, PBCH, etc., may be transmitted in the ABS to guarantee an operation of devices in a corresponding cell. The wireless device belonging to the victim cell may acquire timing information on the basis of CRS transmitted in the ABS of the aggressor cell. This has an advantage in that timing can be acquired at a time, in comparison with the conventional timing acquisition which uses two synchronization signals, i.e., a primary synchronization signal (PSS) and a secondary synchronization signal (SSS). That is, the wireless device first receives the PSS to adjust a slot synchronization, and subsequently receives the SSS to adjust a frame synchronization. However, when using the CRS, the slot synchronization and the frame synchronization can be adjusted at a time.

The aggressor cell 1010 may report information regarding a subframe corresponding to a subframe in the ABS within a radio frame to the wireless device 1050 and/or the victim cell 1020. The aggressor cell 1010 may report to the wireless device 1050 about at which subframe the synchronization process is performed based on the CRS among subframes corresponding to the ABS.

If the macro cell 1010 has a significantly great cell coverage, the macro cell 1010 may report time of arrival (ToA)

information to the wireless device 1050. The wireless device may have a relatively small window size, and may acquire a synchronization for the pico cell 1020.

The macro cell 1010 needs to recognize approximate locations of wireless devices which cannot obtain the synchronization of the pico cell 1020 in order to calculate the ToA. For this, the two cells may exchange information regarding the coverage extension.

If a synchronization error is determined to be less than 3 us, the wireless device 1050 may acquire frame timing t0(=t1+ ToA) of the pico cell 1020, and thereafter may set a search window to [t0−3 us, t0+3 us]. t1 denotes frame timing of the macro cell 1010.

Figure 12:
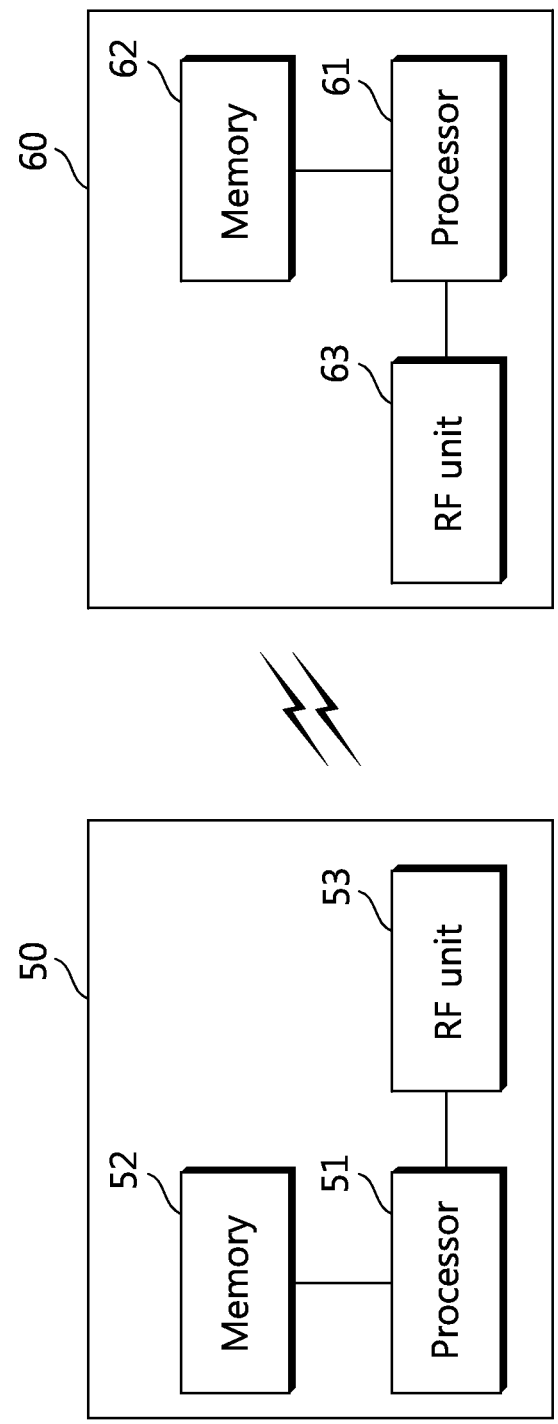
FIG. 12 is a block diagram of a wireless communication system according to an embodiment of the present invention.

FIG. 12 is a block diagram of a wireless communication system according to an embodiment of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data in a wireless communication system, the method comprising:
    monitoring, by a wireless device, a downlink control channel on a subframe based on a reference signal specific to the wireless device;
    receiving a downlink grant on the downlink control channel;
    determining a size of a downlink transport block on the basis of the downlink grant; and
    receiving the downlink transport block on a downlink shared channel,
    wherein a maximum size of the downlink transport block is limited to be less than or equal to a specific value,
    wherein the size of the downlink transport block is determined based on modulation and coding scheme (MCS) information included in the downlink grant, and
    wherein the MCS information indicates an MCS lower than an MCS acquired based on the reference signal.

2. The method of claim 1,
    wherein the downlink grant includes information on the number of allocated resource blocks, and
    wherein the size of the downlink transport block is further determined based on the number of allocated resource blocks.

3. The method of claim 1, further comprising:
    reporting, by the wireless device, a channel state indicating the MCS information to a base station.

4. The method of claim 1, wherein the downlink control channel is monitored based on an identifier of the wireless device.

5. The method of claim 1, wherein if a timing advance (TA) value is greater than a threshold, the maximum size of the downlink transport block is further limited to be less than or equal to the specific value.

6. The method of claim 1, wherein
    the subframe includes a control region and a data region,
    the downlink control channel is monitored in the data region of the subframe.

7. The method of claim 1, further comprising:
    transmitting a request to a base station to transmit the downlink control channel on a front part of the subframe, if a timing advance (TA) value is greater than a threshold.

8. The method of claim 1, further comprising
    transmitting, by the wireless device, information on at least one of a recommended size of the downlink transport block and a recommended MCS index to a base station.

9. The method of claim 8, wherein the information is transmitted if a timing advance (TA) value is greater than a threshold.

10. The method of claim 1, further comprising:
    calculating, by the wireless device, a block error rate (BLER);
    determining, by the wireless device, a MCS index satisfying a condition that the BLER does not exceed a predetermined value,
    reporting, by the wireless device, the MCS index to a base station.

11. A wireless device in a wireless communication system, the wireless device comprising:
    a radio frequency (RF) unit configured to transmit and receive a radio signal; and
    a processor operatively coupled to the RF unit and configured to:
    monitor a downlink control channel on a subframe based on a reference signal specific to the wireless device;
    receive a downlink grant on the downlink control channel;
    determine a size of a downlink transport block on the basis of the downlink grant; and
    receive the downlink transport block on a downlink shared channel,
    wherein a maximum size of the downlink transport block is limited to be less than or equal to a specific value,
    wherein the size of the downlink transport block is determined based on the MCS information, and wherein the MCS information indicates an MCS lower than an MCS acquired based on the reference signal.

12. The wireless device of claim 11,
wherein the downlink grant includes information on the number of allocated resource blocks, and
wherein the size of the downlink transport block is further determined based on the number of allocated resource blocks.

13. The wireless device of claim 11,
wherein the processor is conjured to report a channel state indicating the MCS information to a base station.

* * * * *